Jan. 22, 1929.  A. J. LOEPSINGER  1,699,706
VALVE
Filed Nov. 7, 1925   3 Sheets-Sheet 3
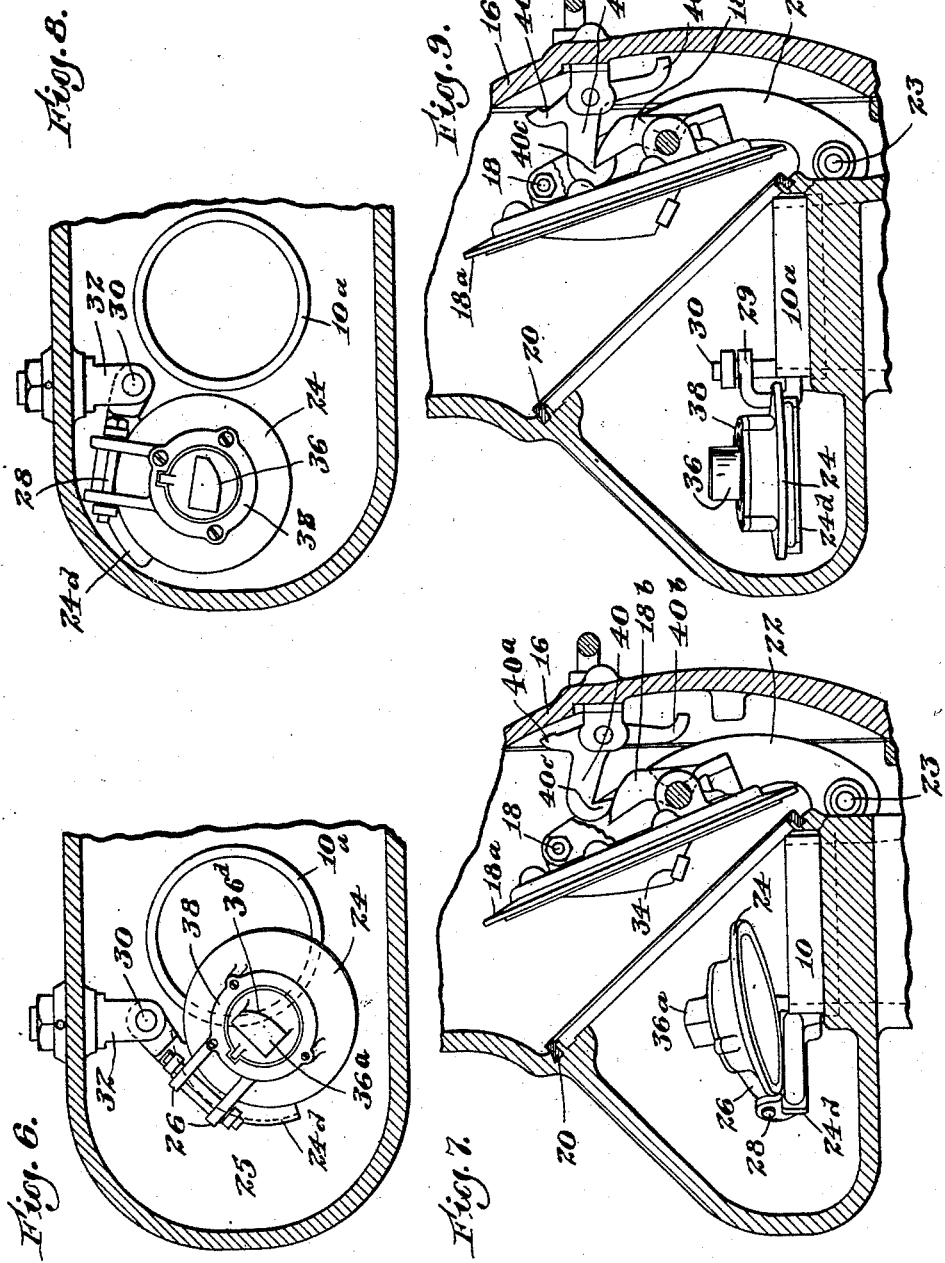
Inventor
Albert J. Loepsinger
by Mitchell, Chadwick & Kent
Attorneys Patented Jan. 22, 1929.

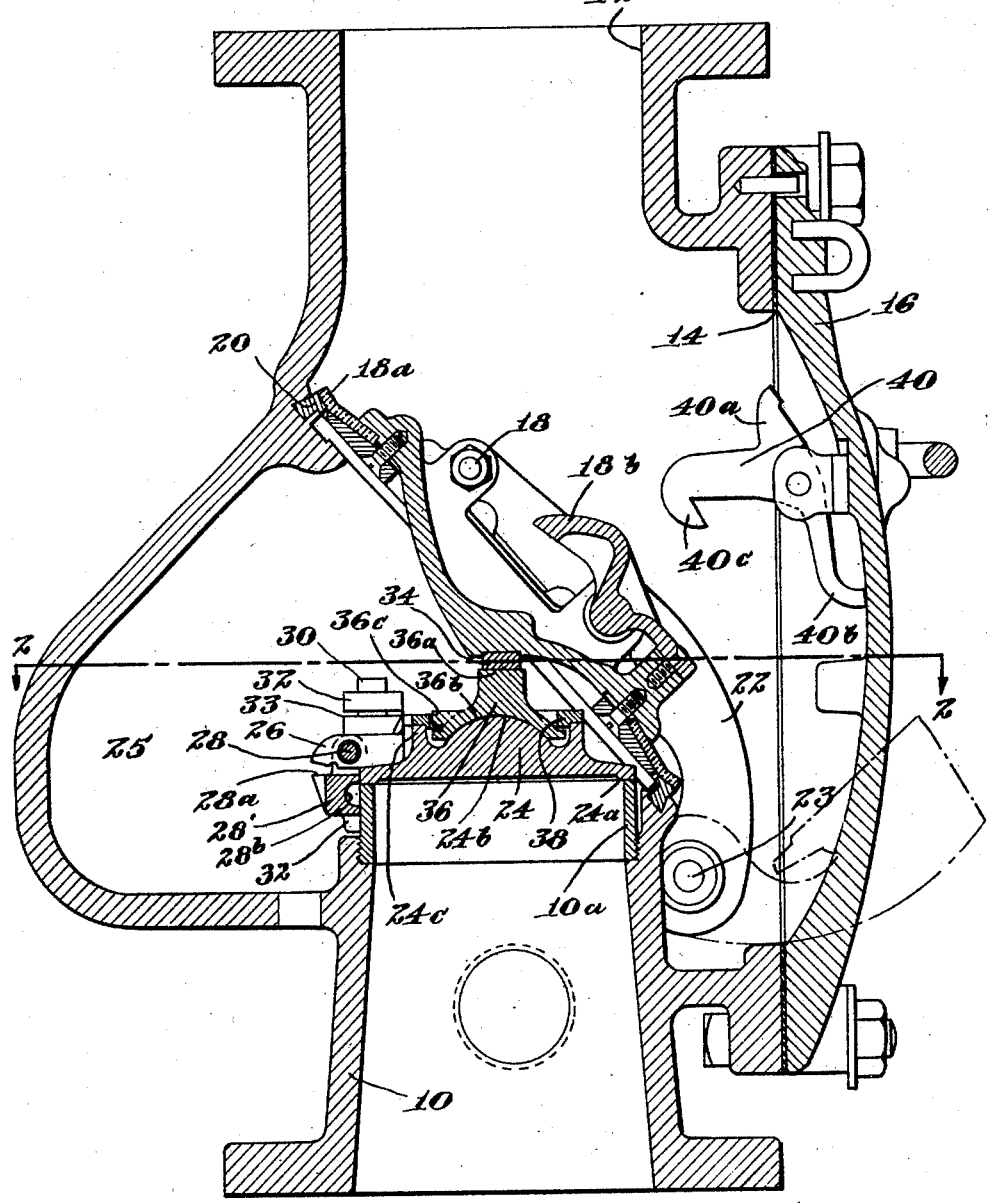

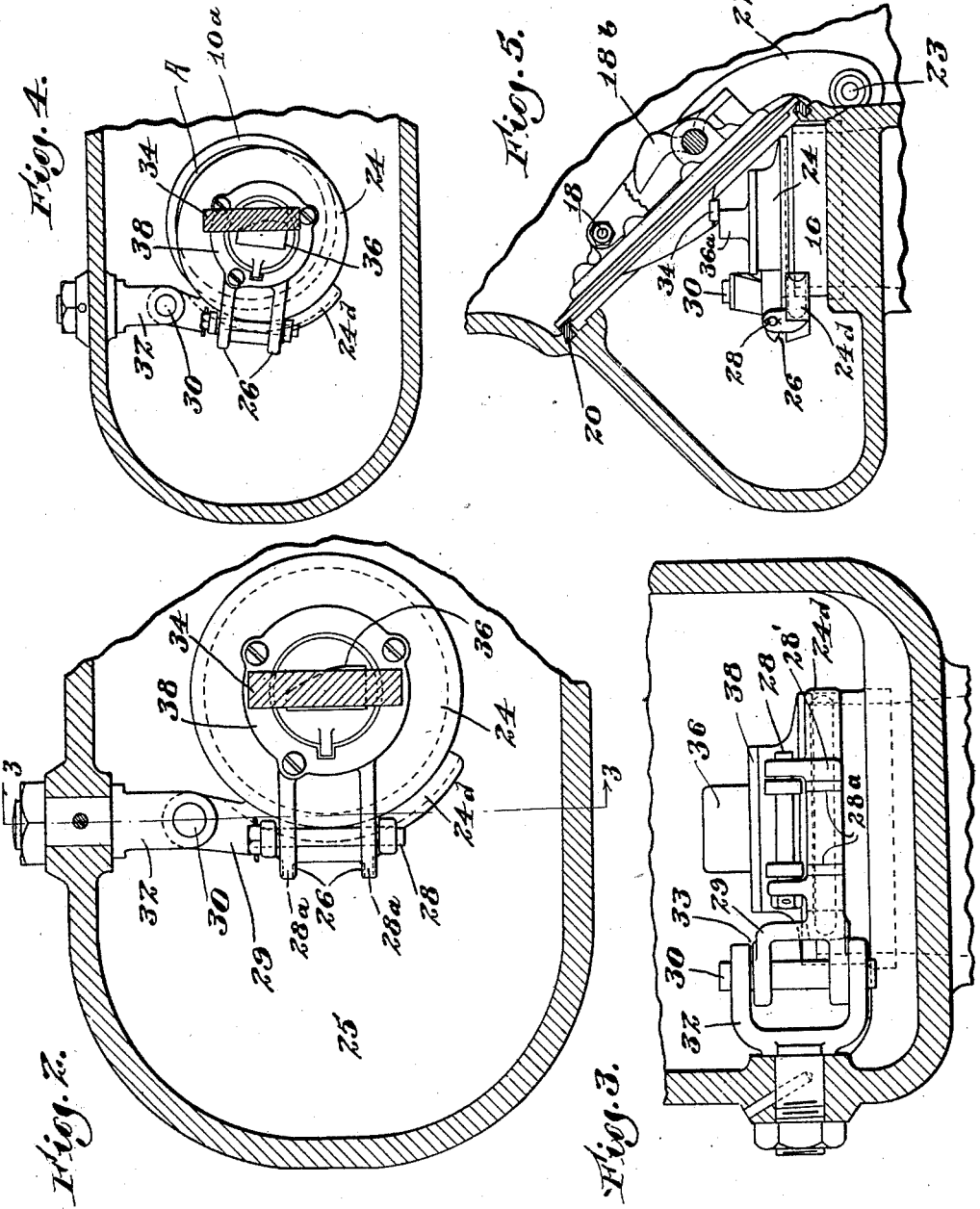

1,699,706

UNITED STATES PATENT OFFICE.

ALBERT J. LOEPSINGER, OF PROVIDENCE, RHODE ISLAND, ASSIGNOR TO GENERAL FIRE EXTINGUISHER COMPANY, OF PROVIDENCE, RHODE ISLAND, A CORPORATION OF DELAWARE.

VALVE.

Application filed November 7, 1925. Serial No. 67,527.

This invention relates to improvements in valves. More especially it relates to the mounting and movement of the clapper, for the speedy and irreversible automatic opening of the valve. The invention is especially valuable for dry pipe valves of sprinkler systems, for fire protection, and is here illustrated as it may be applied to a differential valve of this type, having the device embodying differential of leverage and of area illustrated in my Letters Patent 1,196,874 and 1,196,875 of September 5, 1916, whereby a relatively low air pressure in the distribution system holds in check a supply of water at high pressure.

When a fire occurs, the opening of a sprinkler head causes reduction of the air pressure, but this is necessarily gradual, and in valves as heretofore constructed, the condition of approximate balance when reached may continue for some time before the valve opens. While this approximate balance continues the water clapper may lift slightly and close again, with oscillations of fluid pressure which occur, especially if demands of other fire fighting apparatus in the neighborhood are experienced. The small spurts thus passing the water clapper may not be large enough to make a permanent opening, nor indeed to close the drip valve and thus to fill the intermediate chamber and open the air clapper, the latter having a flexible sheet-rubber edge which remains closed during small oscillations. Under such circumstances the intermediate chamber between the clappers remains open to atmosphere because its vent (which also drains any small leakages of water and therefore is called a drip valve) is automatically closed only by the advent of a large flow such as occurs upon any considerable opening of the water clapper. Upon such closure, if the opening force has not yet overpowered the differential of the air clapper, the filling of the intermediate chamber, which follows the closure of this drip, applies the water supply pressure directly to the air clapper and thus with the differential destroyed effects its opening.

When a fire is starting every second is valuable, especially when water pressure is normally low, as in many large cities; and subject to sudden demands by other fire apparatus in the vicinity. And in some types of valves the clappers may be reseated if for any reason the direction of pressures or flow suddenly changes, before the valve is fairly open, as by a reverse surge caused by entrapped air or by suction of water by fire engines in the neighborhood or by the opening of an adjacent dry pipe valve, in which case there arises danger that the weight of water column thus caught above the air clapper should thereafter maintain the valve closed by reason of the differential and so render the sprinkler system inoperative at the very moment of need. It has been considered necessary to guard against this latter by adding a latch acting as a separate element to hold a valve open at least a little once it has been lifted.

The present invention provides for the kinetic force of the water flow to swing the water clapper laterally from its seat when the flow is in one direction, but the water does not move it when the flow is in the reverse direction. Thus the clapper cannot be reseated by action of the water or air after once it has been thus moved to any degree,— because of which it is herein termed "irreversible." This kinetic force of water flow may be applied to any part of the moving member of the valve, as for example to the body of the clapper when its face is oblique to the axis of water flow, or to a vane attached to the clapper in position to be struck by the water flow. This latter application of the invention provides for the opening motion to be effected, even though the face of the clapper extends straight across the water course, as is the case in some valves when closed, and at the first instant of opening, during the initial spurt of water into the intermediate chamber. The continued inflow of water that follows such an irreversible opening quickly closes the drip, and destroys the differential because the water supply then has access to the under side of the air clapper. In any case however the inrush of water, which to a limited degree, tips upward the water clapper mounted in accordance with the invention, bears against that clapper with a force which has a lateral component that swings it sidewise to a position outside the water course. To this end in the embodiment which is illustrated the water clapper is doubly pivoted; first on an axis transverse to the direction of flow beside the water way, comprising an arm; and, second, on an axis beside the water way and parallel to the said direction of flow, about which second axis the said arm is pivoted. Once the water clapper is open the air clapper becomes a simple check valve. Preferably it is mounted to swing through only a short course and then to lock itself open, as this can be accomplished with only small dimensions of casing. Among the incidental advantages of the invention are reduced size, weight and cost of valve for a given capacity of flow; simplicity in manufacture; and ease of handling, setting, inspection and general operation; while the irreversible opening by kinetic force provides quick and permanent destruction of the differential, when need for action of the valve arises, even under low pressures of water supply.

It is intended that the patent shall cover by suitable expression in the appended claims whatever features of patentable novelty exist in the applicant's invention disclosed.

In the accompanying drawings:

Figure 1 is an elevation in section showing the valve closed;

Figure 2 is a plan of the closed water clapper in section on line 2—2 of Figure 1, but with the air clapper and a portion of the casing removed;

Figure 3 is an elevation of the closed water clapper in section on line 3—3 of Figure 2;

Figure 4 is a plan like Figure 2, but with the water clapper in a slightly open position it may take following its initial lifting;

Figure 5 is an elevation like Figure 1, showing the air clapper slightly swung about its axis, but still closed, with the water clapper positioned as in Figure 4;

Figure 6 is a plan like Figure 2, showing the water clapper in an intermediate position following the opening of the air clapper;

Figure 7 is an elevation like Figure 1, showing the air clapper in an intermediate position of its opening swing and the water clapper in the position shown in Figure 6;

Figure 8 is a plan, like Figure 2, showing the water clapper fully open; and

Figure 9 is an elevation, like Figure 1, showing both clappers in open positions.

Referring to the drawings, which illustrate a preferred form of the invention, the valve casing will ordinarily be set with its water way from inlet passage 10 to outlet passage 12, extending vertically. The hand hole 14 and its removable cover 16 are at that side of the casing toward which the air clapper 18 swings in opening, and may be large enough so that the clapper can swing out of the casing, giving easy access to the water clapper 24 and its seat which lie beneath the air clapper when closed. The air clapper has the usual sheet-rubber edge 18$^a$, closing down upon a seat 20 set obliquely across the water-way, and is carried by a pair of arms 22 pivoted on bearings 23 close by the water-way at a point below the planes of both the air clapper and the water clapper 24. The water clapper's seat lies in a plane perpendicular to the water-way, at the end of the inlet passage 10, and this clapper preferably has a metallic face 24$^a$ which finds its seat upon a metallic ring 10$^a$. This clapper can swing up to a limited extent, for example about 15 degrees, about a horizontal axis 28 at the side of the waterway opposite that at which the air clapper is pivoted. It has short arms 26 pivoted on this horizontal pivot pin 28 which in itself is movable with its supporting arm 28' about a vertical pivot 30, but which, when closed, extends substantially parallel to the pivotal axis of the air clapper as seen in Figures 1 and 2. A yoke end 29 on this arm, 28', seen in Figure 3, turns on the vertical pivot 30 which is supported adjacent within the casing, by a suitable bracket 32, Figure 3. The water clapper can therefore be swung in two ways, viz, upward about the axis 28, and sidewise, about the axis 30. It can also rise vertically a short distance from its closed position, until the upper arm of yoke 29 is stopped by the upper arm of bracket 32, this distance being indicated at the broad crack 33, Figures 1, 3. This last mentioned movement does not push the air clapper 18 upward enough to unseat the flexible edge of the air clapper, but it is enough to let a substantial jet or sheet of water issue laterally between the water clapper 24 and its seat 10$^a$.

When the valve is closed the air clapper 18 holds down the water clapper by pressure transmitted downward, through its plane bearing plate 34, on the under side of the air clapper to an intermediate plate 36. The latter has an upward-facing, bearing surface 36$^a$, preferably over the middle of the water-way; and it has a downward-facing spherical bearing surface 36$^b$ at its bottom, coacting with a spherical bearing surface 24$^b$ on the top of the water clapper 24. A flange-ring 38, secured on a circular rib 24$^c$ on the water clapper, overlies the peripheral edge of the said intermediate plate 36 and holds the latter in place on the water clapper. A lug 36$^c$ on this on intermediate plate engages a notch on the flange rim 38, to prevent horizontal rotation of the plate and dislocation of its upward-facing bearing surface 36$^a$. This arrangement provides sufficient looseness so that the water clapper can shift a little on its sperical contact with the intermediate plate to find a good seat, and so that the intermediate plate can thereafter shift on its spherical contact with the water clapper to permit sufficient tilting of the air clapper to bring its arms into contact with the under side of the bearing 23, in accordance with the principles of operation set forth in my Letters Patent Number 1,196,875 of September 5, 1916. The engagement of the flange-ring 38 with the peripheral edge of the intermediate plate causes the intermediate plate and water clapper to swing together when opening or closing.

When the clappers are closed, water under the service pressure, which for illustration may be assumed to be about sixty pounds per square inch, stands up to the water clapper 24, tending to open it; and air under lower pressure, say at fifteen pounds or more presses down upon the air clapper 18 which holds the water clapper to its seat by virtue of the combined differentials of area and of leverage. The clappers are so arranged that the axis of air pressure extends outside of the spherical surfaces of the intermediate plate and water clapper on the side away from the pivot 23, in which case the air clapper arms 22 will be pressing upward on the pivot 23 and the air and water forces will have turning movements about this point of contact. There should be sufficient looseness in the fit of the yoke 29 and of the other parts to permit the air and water clappers to turn as a unit about the pivot 23 in the initial part of the opening movement.

Upon the opening of a sprinkler head air escapes and pressure upon the air clapper diminishes until the rotative forces applied to the valve are balanced, which may occur at about ten pounds of air pressure. With further fall, or with oscillatory surges on either air or water side of the valve a slight lifting of both clappers together will occur, the water clapper 24 and its immediate parts moving upward along pin 30 with corresponding swing or lift of the air clapper, but without the latter becoming unseated. But this lifting of the water clapper, however slight, opens a thin space between the clapper face 24$^a$ and its seat 10$^a$ through which water issues in a thin, forceful, horizontal stream, or radial jet, in all directions. The water clapper arm 28′ has a surface or bucket 28$^d$ at the plane where this initial jet occurs curved around the edge of the clapper in position to receive impact of that part of the jet which is moving in the direction in which the water clapper is to open. This recessed face 28$^b$ is similar in shape and function to the bucket of a water motor, in that it is propelled by the jet. Under this propulsion of high pressure water it swings the water clapper about the pin 30 as an axis, thereby quickly making an opening from the high pressure supply straight into the intermediate chamber 25, which quickly fills so that the supply pressure is applied to the air clapper with all differentials destroyed.

As the air clapper swings open the rush of water carries the water clapper up about its lateral horizontal pivot 28 to a suitable angle where it constitutes a vane that is thrust violently and instantly out of the waterway by the main rush of water. The details of this whole opening movement, which can be inferred from observation of repeated tests, indicate that the initial lateral swing of the water clapper occurs instantly after its initial lifting has produced impact of the strong lateral jet on its bucket, without waiting for this inflow of water to close the drip valve of the intermediate chamber and to apply high pressure directly to the air clapper. In this case the top bearing surface of the intermediate plate slides along the under bearing surface 36$^a$ of the air clapper. As soon as this has proceeded for a little distance, for example as far as indicated in Figure 4 at A, water strikes upward past the edge of the water clapper directly against the air clapper and tends to raise it. Whatever lateral movement of the water clapper occurs is a permanent opening, irreversible by any subsequent downward movement of the two valves. And when the air clapper is flung upward around its bearing 23 toward the hand hole cover 16, it is latched against return to its seat.

With the particular latch illustrated an automatic certainty of latch-locking exists. The latch 40 projects toward the hook 18$^b$ on the back of the opening air clapper, and has a tail 40$^b$ in position to be engaged by the swinging clapper as soon as the hook 18$^b$ has come into position to be engaged by the latch hook 40$^c$. The swinging clapper pushes the lever, 40 upward when the clapper hook 18$^b$ hits it, as seen in Figure 7, its swing being limited by an upstanding arm 40$^a$ striking the cover 16, and then swings the lever 40 and its hook 40$^c$ downward by the engagement of the clapper hook with the depending tail 40$^b$, thus turning the lever of which this tail constitutes one end while the hook 40$^c$ constitutes its other end and is thus forced down behind the hook 18$^b$. This holds the air clapper open, permanently, regardless of subsequent surge or re-surge. During large flow the air clapper can stand substantially vertical, but upon diminution of flow, or during a resurge if such occurs, the clapper can fall toward its seat into the position shown in Figure 9, which is the closest it can come to reseating until the cover has been removed and the valve reset by human hand. The opening of the air clapper may be even quicker than is above intimated, for the initial circular jet of water from the slight lifting of the water clapper, and immediately afterward that through the direct opening A, both impinge upon the air clapper; and the imposition of these forces in addition to those passing up through the intermediate plate 36, which already have produced the trembling air clapper, may be enough to drive it open without waiting for the intermediate chamber 25 to become filled.

As the air clapper is lifted the water clapper also is lifted, being partially swung about the horizontal pin 28. It may be also turned somewhat about the vertical pin 30 because of a cam effect produced between the downward facing bearing 34 on the air clapper and the upward facing bearing surface 36ᵃ on the intermediate plate. The right rear corner, at 36ᵈ of the latter surface is rounded, so that as the surfaces rise with the lifting of the clappers they also separate, the intermediate plate tending to turn with its water clapper away from the bearing 34 of the air clapper, the latter sliding along the curved edge of surface 36ᵃ. This turning, however, is more or less limited, for the upward swing of the water clapper on the arm 28 is soon stopped by the ends of the projections 26 beyond this axis 28, bottoming on the lugs 28ᵃ on the side of arm 28'. Thus the water clapper becomes itself set with its face extending obliquely across the waterway, in which case it acts as a vane. The force of the water alone rushing against it there has a lateral component which swings it aside, turning it about the pin 30. Its position during this swing is shown in Figures 6 and 7, and its final resting place in Figure 8 and 9 where it is entirely out of the water-way, and the differential is irreversibly destroyed.

When swung to its final resting place, the water clapper is tilted downward about its axis 28 so that part of it is below the plane of its seat. Accordingly any tendency of eddy currents in the valve chamber to swing the water clapper toward its seat would be opposed by the engagement of the edge of the clapper with the edge of the valve seat ring 10ᵃ.

I claim:

1. A valve adapted for automatic opening having an inlet passage and a clapper seated across it, closing it and mounted to open in a direction transverse to the axis of the seat; said clapper having a surface which during its opening movement is within the course of flow through the valve and oblique to the direction of said flow, whereby the force of flow acting on said surface moves said clapper in said transverse direction.

2. A valve adapted for automatic opening having mounting means comprising a pivot extending in the general direction of flow through the valve seat and means whereby said valve in opening is swung about said pivot by the force of said flow to a position beside its seat; said means being adapted to permit said valve while in said position to fall below its seat and thereby prevent its return thereto.

3. A valve adapted for automatic opening having mounting means comprising a pivot extending in the general direction of flow through the valve seat and a second pivot substantially at right angles to the first mentioned pivot, whereby the valve may be swung by the force of flow about said second pivot to a position oblique to the axis of the valve seat and may be swung to one side of its said seat about the first mentioned pivot by the force of flow acting on the valve in its said oblique position; the valve being so mounted on said second pivot that when swung to one side of its seat it may fall below the plane of the seat.

4. A valve adapted for automatic opening having an inlet passage and a clapper seated across it, closing it and mounted for withdrawal perpendicularly to the direction of flow through its seat and provided with a surface exposed to the flow and extending at such face exposed to the direction of flow against it that an angle to the direction of flow against it that the force of said flow thereagainst moves said clapper to effect said withdrawal.

5. A valve adapted for automatic opening having an inlet passage and a clapper seated across it, closing it and mounted for withdrawal perpendicularly to the direction of flow through its seat, combined with means whereby the force of the flow on the body of said clapper moves said clapper to effect said withdrawal.

6. A valve adapted for automatic opening having mounting means comprising a pivot extending in the general direction of flow through the valve seat; and means whereby said valve in opening is swung about said pivot by the force of said flow.

7. A valve adapted for automatic opening having mounting means comprising a pivot extending in the general direction of flow through the valve seat; there being a surface, offset from the axis of the pivot, located on the member of the valve which moves in opening, in position to receive impact of the flow and facing at such an angle to the flow that said impact applies to the valve a turning force about the pivot to open the valve.

8. A valve adapted for automatic opening having an air clapper and a water clapper cooperating when closed and mounted so as to be separated when open; mounting means therefor permitting the water clapper in opening to be moved initially with the flow to a predetermined position in the path of flow and oblique across the direction of said flow; and a stop preventing further movement in said direction, whereby the force of flow acting on the water clapper moves this clapper laterally out of the course of flow while thus held obliquely.

9. A valve having a clapper and mounting means therefor comprising an arm rotatable about an axis beside the course of flow and extending in the general direction thereof; and means connecting the clapper with said arm, adapted to permit the clapper to be swung a limited degree by the flow to a position in the path of flow and oblique to the direction of flow, whence the flow rotates said clapper about said axis.

10. A dry pipe valve having a clapper mounted upon an axis close by the waterway and extending approximately parallel to the direction of flow; said clapper being mounted and adapted to be moved laterally, by the flow, about said axis to a position outside the waterway.

11. A dry pipe valve having a clapper and mounting means therefor comprising a pair of axes arranged perpendicularly to each other, about one of which axes the clapper can be swung a limited degree to a position in the path of flow and oblique to the direction of flow and about the other of which axes it can then be turned laterally to one side of the waterway.

12. A differential dry pipe valve having an air clapper and a water clapper cooperating when closed and separated when open; and mounting means for the water clapper comprising a plurality of axes, about one of which the clapper is movable from its closed position to an intermediary position which is in the path of flow and oblique to the direction of flow, and about the other of which the clapper is movable from the intermediary position to a position which is out of the path of flow; the clapper being movable as aforesaid by the force of flow.

13. A differential dry pipe valve having an air clapper and a water clapper cooperating when closed and mounted so as to be separated when open; the water clapper being mounted on an axis parallel to the direction of flow and being movable in the general direction of flow for initial opening, thereby admitting water under pressure to the water side of the air clapper; the said water clapper being adapted to be swung about said axis, laterally of the direction of flow, as the air clapper moves to its separated position.

14. A differential dry pipe valve having an air clapper and a water clapper cooperating when closed and mounted so as to be separated when open; the water clapper being mounted on an arm which arm is pivoted on an axis outside of the waterway and parallel to the direction of flow; said arm and water clapper being movable in the general direction of flow for initial opening; and said water clapper being arranged to swing about said arm to a position oblique across the waterway upon the opening of the air clapper, whereby the kinetic force of the flow swings the water clapper further about said axis to a position outside the waterway.

15. A valve adapted for automatic opening having an inlet passage and a clapper seated across it, closing it and mounted for withdrawal in direction substantially parallel to the plane of its seat and having elements exposed to the flow at such an angle that the force of the flow thereagainst moves said clapper in direction to effect said withdrawal.

16. A valve adapted for automatic opening having a seat about its inlet passage; a clapper, seating upon said seat when the valve is closed; and mounting means for said clapper whereon the clapper is movable when opening to a position in the course of flow and at an angle to the direction of flow against it, whereat the force of the flow against the clapper can move it thence laterally to one side of the seat in a direction substantially parallel to the plane of the seat.

17. A valve adapted for automatic opening having mounting means comprising a pivot extending in the general direction of flow, and adapted to permit said valve when opening to move initially with the flow a limited distance along said pivot; said valve having a surface exposed to the flow and extending at such an angle to the direction of flow that when moved said limited distance the force of the flow can swing said valve about said pivot.

Signed at Providence, Rhode Island, this 26th day of October, 1925.

ALBERT J. LOEPSINGER.